G. A. KOENIG.
PROCESS FOR EXTRACTING VANADIUM FROM ITS ORES.
APPLICATION FILED SEPT. 21, 1910.
986,180.
Patented Mar. 7, 1911.
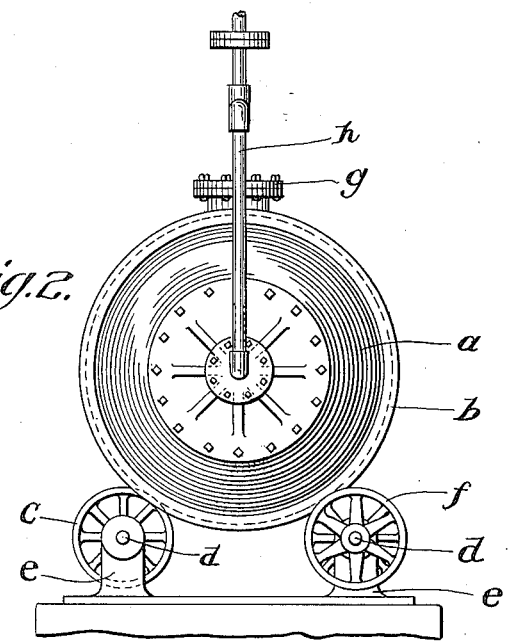
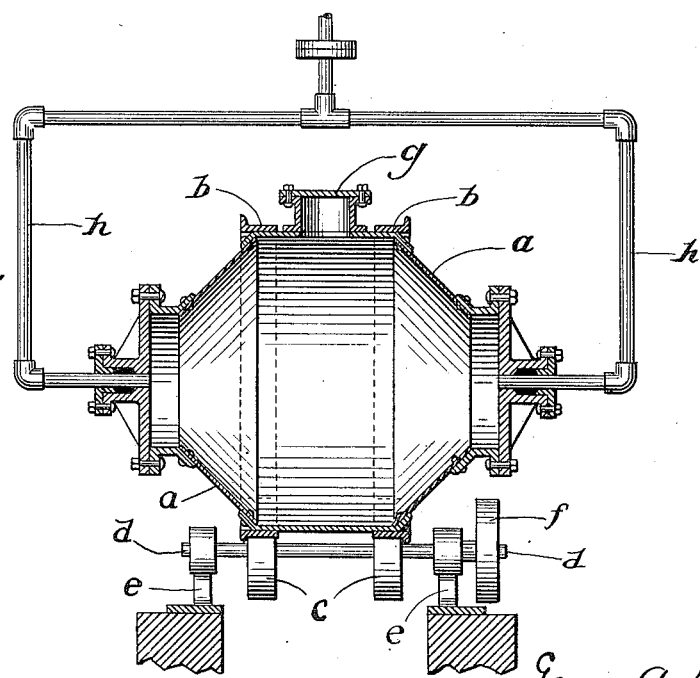

UNITED STATES PATENT OFFICE.

GEORGE A. KOENIG, OF HOUGHTON, MICHIGAN.

PROCESS FOR EXTRACTING VANADIUM FROM ITS ORES.

986,180. Specification of Letters Patent. Patented Mar. 7, 1911.

Application filed September 21, 1910. Serial No. 583,014.

*To all whom it may concern:*

Be it known that I, GEORGE A. KOENIG, a citizen of the United States, and a resident of Houghton, in the county of Houghton and State of Michigan, have invented certain new and useful Improvements in Processes for Extracting Vanadium from its Ores, of which the following is a specification.

My invention relates to improvements in processes for the recovery of vanadium from its ores, particularly from the vanadiniferous sandstone of southwestern Colorado and other places.

I have discovered that roscoelite, or ores of vanadium containing substantially the same mineral substances, can be completely decomposed and dissolved by the action of a water solution of sulfuric, hydrochloric, or other acid under proper heat and proper pressure. In practice I find that the action of about a twenty per cent. solution of sulfuric, hydrochloric, or other acid upon roscoelite at a temperature of about 200° centigrade and under a pressure of about 225 pounds per square inch, which corresponds to such a temperature in a closed vessel, will completely dissolve and decompose this mineral within a few hours. This is the first step in treating the mineral preparatory to recovering the vanadium and is, I believe, new.

On account of its cheapness I prefer to use sulfuric acid, but as other acids will, under suitable conditions, accomplish my purpose I do not desire to limit myself to the use of any one of them.

The mineral having been decomposed and dissolved as above is filtered and the filtered solution is evaporated to a mushy consistency. The mushy material is then placed in a retort or muffle and is heated gradually until brought to a bright red heat to drive out the acid which may be recovered in the usual manner. The acid having been driven out the residue is a mixture of the oxids of vanadium, aluminum, manganese, iron and other oxids that may be present in the ore, plus certain undecomposable sulfates of calcium, potassium, &c. The mixture of oxids and undecomposable sulfates is now mixed with sodium carbonate in proper quantity and is roasted at a red heat in an oxidizing flame either with or without the addition of oxidizing agents. The roasted mass is now disintegrated with boiling water, preferably in a boiler furnished with one of the well known forms of stirring apparatus, and after disintegration, and while still in the boiler, is treated with carbon dioxid to precipitate the aluminum hydroxid. I believe this separation of sodium vanadate from sodium aluminate to be new.

In the drawings Figure 1, is a central sectional elevation of a vessel in which the ores of vanadium can be subjected to the action of sulfuric acid, heat, and pressure; Fig. 2, an end elevation of Fig. 1.

$a$ is a rotating vessel, in the present case furnished with tires $b$ which rest upon wheels $c$ the shafts $d$ of which are carried in suitable bearings $e$ and one of which is furnished with a pulley $f$ by means of which it and its wheels may be driven to rotate the vessel $a$.

$g$ is a port through which the vessel $a$ may be charged and discharged; $h$ are steam pipes leading to a boiler, not shown, for conducting steam under pressure to the vessel $a$. The pipes $h$ enter the vessel $a$ through stuffing boxes placed at its sides and upon its horizontal axis.

Having thus described my invention I claim as new and desire to secure by Letters Patent:—

1. The described method for decomposing and dissolving the ores of vanadium which consists in subjecting them, under heat and pressure, to the action of an aqueous solution of sulfuric acid.

2. The described method for decomposing and dissolving roscoelite which consists in subjecting the mineral to the combined action of, about, a twenty per-cent. water solution of sulfuric acid and steam at a temperature of about 200° centigrade in a closed vessel.

3. The described method for recovering vanadium from its ores, more particularly roscoelite, which consists in subjecting the ore to the action of an aqueous acid solution under heat and pressure, filtering and evaporating the resulting mass to a mushy consistency, driving out the acid by heat, mixing the dried mass with sodium carbonate and roasting this mixture at a red heat in an oxidizing flame, disintegrating the roasted mixture with boiling water, and finally in treating the boiling mixture with carbon dioxid to precipitate aluminum hydroxid.

GEORGE A. KOENIG.

Witnesses:
ELSA KOENIG NITZSCHE,
GEO. E. NITZSCHE.